US007007274B1

(12) United States Patent
Patel et al.

(10) Patent No.: US 7,007,274 B1
(45) Date of Patent: Feb. 28, 2006

(54) WEB-BASED APPARATUS AND METHOD FOR ENHANCING AND MONITORING PICTURE ARCHIVING AND COMMUNICATION SYSTEMS

(75) Inventors: Maqbool Patel, Bangalore (IN); Anand Krishnamurthy, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/472,290

(22) Filed: Dec. 27, 1999

(51) Int. Cl.
*G06F 9/445* (2006.01)
(52) U.S. Cl. .................... 717/176; 714/37; 709/224
(58) Field of Classification Search ............... 717/176; 709/217, 221, 222, 227, 224; 713/202; 380/231, 380/232; 714/37
See application file for complete search history.

(56) References Cited

U.S. PATENT DOCUMENTS

| | | | | |
|---|---|---|---|---|
| 5,307,354 A | * | 4/1994 | Cramer et al. ............... | 714/4 |
| 5,359,512 A | * | 10/1994 | Nishihara .................... | 382/128 |
| 5,881,236 A | * | 3/1999 | Dickey ......................... | 709/220 |
| 6,094,531 A | * | 7/2000 | Allison et al. .............. | 717/176 |
| 6,178,225 B1 | * | 1/2001 | Zur et al. .................... | 378/98.2 |
| 6,192,518 B1 | * | 2/2001 | Neal ........................... | 709/221 |
| 6,223,345 B1 | * | 4/2001 | Jones et al. ................. | 709/220 |
| 6,226,784 B1 | * | 5/2001 | Holmes et al. ............. | 717/100 |
| 6,260,021 B1 | * | 7/2001 | Wong et al. ................ | 705/2 |
| 6,321,348 B1 | * | 11/2001 | Kobata ........................ | 714/37 |
| 6,492,812 B1 | * | 12/2002 | Debbins et al. ............. | 324/309 |
| 6,494,831 B1 | * | 12/2002 | Koritzinsky ................. | 600/301 |
| 6,574,629 B1 | * | 6/2003 | Cooke, Jr. et al. ......... | 707/10 |
| 6,574,742 B1 | * | 6/2003 | Jamroga et al. ............ | 713/400 |

OTHER PUBLICATIONS

Amir, Y., Breitgand, D., Chockler, G. V., Dolev, D., "Group Communication as an Infrastructure for Distributed System Management", Proceedings Third International Workshop, 1996, retrieved from IEEE database Aug. 26, 2002.*
Lawrence, G. Rs., Marin, G. A., Naron, S. E., "Simulation of a Hospital Picture Archiving and Control System (PACS) ", Proceedings of the 1985 Winter Simulation Conference, retrieved from ACM database Aug. 26, 2002.*

(Continued)

*Primary Examiner*—Tuan Dam
*Assistant Examiner*—Mary J Steelman
(74) *Attorney, Agent, or Firm*—McAndrews, Held & Malloy, Ltd.; Peter J. Vogel; Michael A. Dellapenna

(57) ABSTRACT

A method for remotely enhancing a picture archiving communication system (PACS) is provided. The method includes establishing an Internet connection with a server. The method also includes directing the server to simultaneously install software to a plurality of PACS workstations and simultaneously installing software to the plurality of PACS workstations. The method may optionally include, in the directing step, instructing the server to install at least one software update to the plurality of workstations. The method may also optionally include, in the establishing step, logging on to a web server and authenticating a user, and sending an indication message to a remote user to indicate whether the software installation was successful. An alternative embodiment provides an apparatus for remotely enhancing a picture archiving communication system. In another exemplary embodiment of the invention, a method for remotely monitoring a picture archiving communication system (PACS) is provided. The method includes establishing an Internet connection with a server, directing the server to retrieve data from at least one file from at least one of a plurality of PACS workstations, retrieving the data from the at least one file, and transmitting the data to a remote user. Yet another alternative embodiment provides an apparatus for remotely monitoring a picture archiving communication system.

20 Claims, 5 Drawing Sheets

OTHER PUBLICATIONS

Martinez, Dr. Ralph, Hsieh, Sheau-Ling, "Design of Multimedia Global PACS CORBA Environment", IEEE 1996, retrieved from the IEEE database Aug. 26, 2002.*

Ratib, O., M.D., Ph.D., "From PACS to the Wold Wide Web", 1997, retrieved from Google search engine, Aug. 26, 2002.*

* cited by examiner

WEB-BASED APPARATUS AND METHOD FOR ENHANCING AND MONITORING PICTURE ARCHIVING AND COMMUNICATION SYSTEMS

CROSS REFERENCE TO RELATED APPLICATIONS (IF APPLICABLE)

Not Applicable.

STATEMENT REGARDING FEDERALLY SPONSORED RESEARCH & DEVELOPMENT (IF APPLICABLE)

Not Applicable.

BACKGROUND OF THE INVENTION

The present invention relates generally to improvements in Picture Archiving and Communication Systems ("PACS") and in particular to a web-based apparatus and method for remotely enhancing and monitoring a PACS.

Picture Archiving and Communication Systems are used for, among other things, storing, observing and analyzing images obtained in medical applications. PACS may be used with several technologies for observing the interior anatomy of a living being, for example with ultrasound, x-ray or PET images and the like. When using a Picture Archiving and Communication System, it may be desirable for several workstations at a hospital, clinic or laboratory, for example, to have access to PACS images and software to view and/or analyze the images.

Because of the rapid improvements in software for viewing and analyzing such images, it is often desirable to install or update software at each of the several workstations within a hospital. Because software bugs are also often detected after computer software is installed in the workstations, it is often necessary for an engineer to install software to "fix" or correct the bug. Such fixes or corrections are called software patches. Unfortunately, the process of installing the software or software patches on each of the workstations within a single hospital can be very costly and time-consuming. In the past, a field engineer would have to travel to each of the workstations individually and install software or software patches (as indicated in part in FIG. 1). Because each individual hospital may have 150 to 200 workstations or more, this process was very time-consuming and expensive. Moreover, the field engineer would have to be physically present at the hospital to install the software, which may take more of the engineer's time and cost even more money. Also, in some of the hospitals the computer may be present on different floors or other parts of the building which make the installation even more tedious. For example, the amount of the engineer's time taken to install software or software upgrades may be represented as:

Time to upgrade $N$ systems $= (T*N) + X + Y*(N-1)$;

where T is the time to install the software, N is the number of computers to be upgraded, X is the time taken for the FE to travel to and from to the site, and Y is the average time taken for the engineer to go from one computer to another.

Additionally, errors often occur when using Picture Archiving and Communication Systems in, for example, both the software and the display of images on individual workstations. Because the person utilizing the workstation, normally a radiologist or technician, cannot analyze and determine the source of the error, a field engineer must travel to the location of the workstation to determine the source of the error. Additionally, the engineer may have to look separately at several different workstations before finding the source of the error. Such errors may often be detected by reviewing log files, i.e., files that indicate the users of a workstation and when the users logged on and off. As a result, it is very costly and time-consuming for the field engineer to trouble-shoot errors occurring at individual workstations.

Past PACS and computer technology has not presented a Picture Archiving and Communication System or method used therewith that avoids the aforementioned problems of high cost and time consuming software installation on workstations and trouble-shooting of errors on individual PACS workstations.

A need has long existed for such a Picture Archiving and Communication System and method. A further need remains for an improved Picture Archiving and Communication System and method that enable a field engineer to remotely install software and to remotely find and correct errors in individually workstations. It is an object of the present invention to meet these and other needs.

BRIEF SUMMARY OF THE INVENTION

In an exemplary embodiment of the present invention, a method for remotely enhancing a picture archiving communication system (PACS) is provided. The method includes establishing an Internet connection with a server. The method also includes directing the server to simultaneously install software to a plurality of PACS workstations and simultaneously installing software to the plurality of PACS workstations. The method may optionally include, in the directing step, instructing the server to install at least one software update to the plurality of workstations. The method may also optionally include, in the establishing step, logging on to a web server and authenticating a user. The method may additionally optionally include sending an indication message to a remote user to indicate whether the software installation was successful.

In another exemplary embodiment of the present invention, a method for remotely monitoring a picture archiving communication system (PACS) is provided. The method includes establishing an Internet connection with a server, directing the server to retrieve data from at least one file from at least one of a plurality of PACS workstations, retrieving the data from the at least one file, and transmitting the data to a remote user.

Another alternative embodiment of the present invention provides an apparatus for remotely enhancing a picture archiving communication system including a remote first terminal in communication with a web-based server. The remote first terminal generates a remote signal. The apparatus also includes a plurality of PACS workstations connected to the web-based server, and the web-based server comprises an installer for simultaneously installing software to the plurality of PACS workstations responsive to the remote signal.

DETAILED DESCRIPTION OF THE INVENTION

Figure 2:
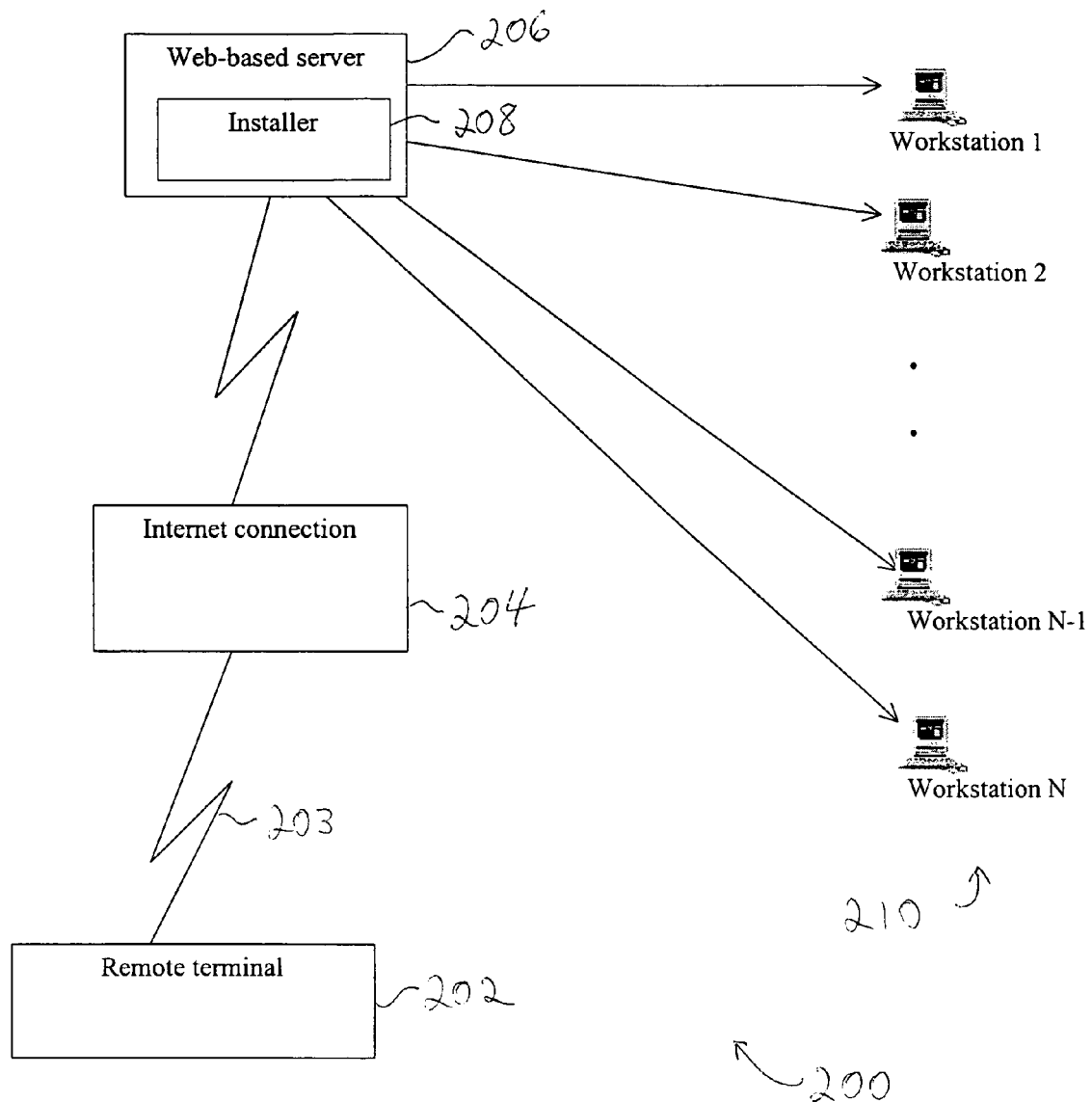
FIG. 2 illustrates a block diagram of an apparatus for remotely enhancing a picture archiving communication system according to a particular embodiment of the present invention.

FIG. 2 illustrates a PACS enhancing apparatus for remotely enhancing a picture archiving communication system 200. The apparatus 200 includes a remote terminal 202, a remote signal 203, and an Internet connection 204. The apparatus 200 also includes a web-based server 206, which contains an installer 208. The web-based server 206 as shown in a preferred embodiment in FIG. 2 is in communication with several workstations 210, number 1 through N in FIG. 2.

Figure 3:
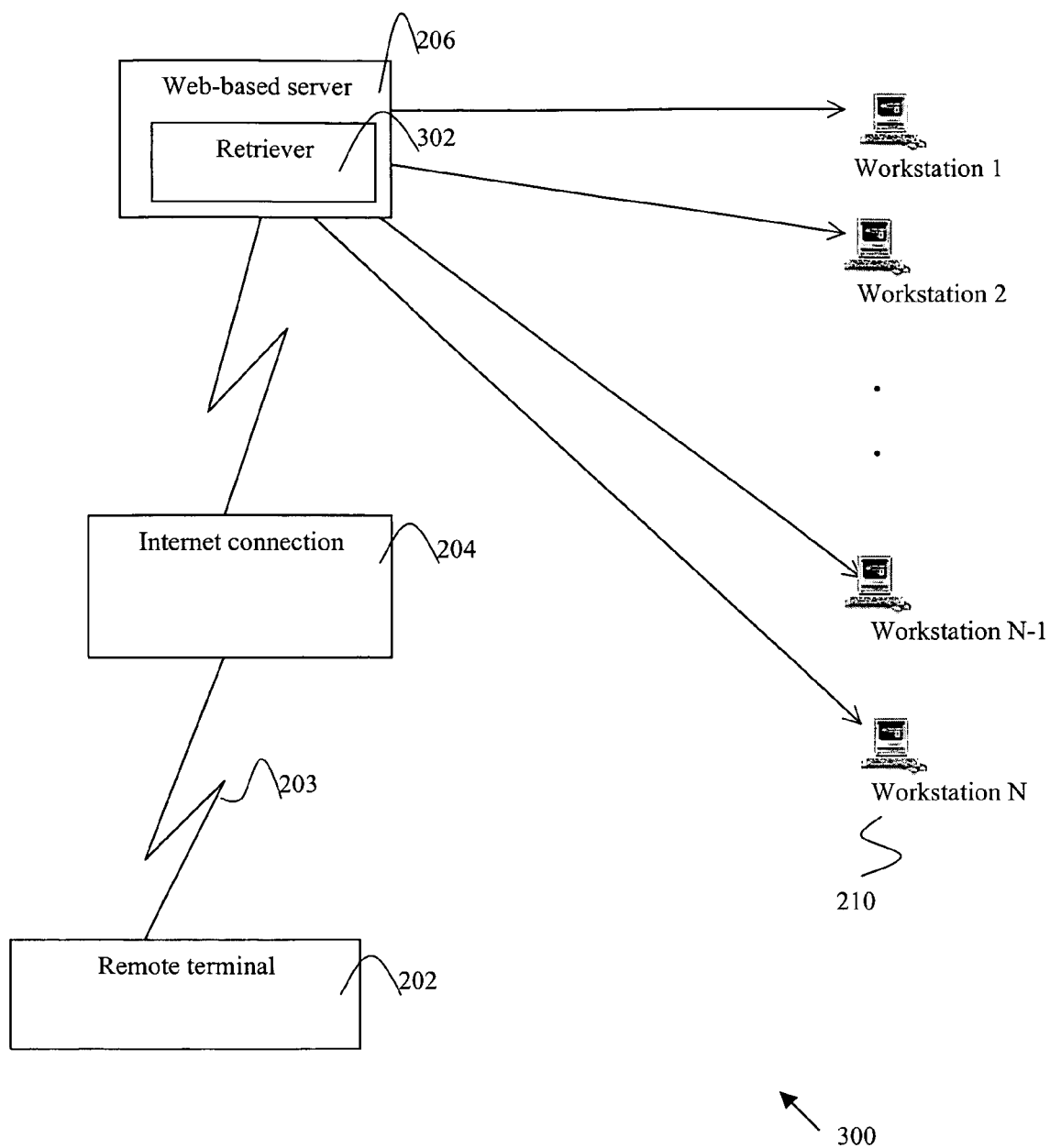
FIG. 3 illustrates a block diagram of an apparatus for remotely monitoring a picture archiving communication system according to an alternative embodiment of the present invention.

FIG. 3 illustrates a PACS monitoring apparatus for remotely monitoring a picture archiving communication system 300. The PACS monitoring apparatus 300 differs from the PACS enhancing apparatus 200 in that instead of an installer 208, the PACS monitoring apparatus 300 includes a data retriever 302 for retrieving data from the plurality of PACS workstations 210.

Figure 4:
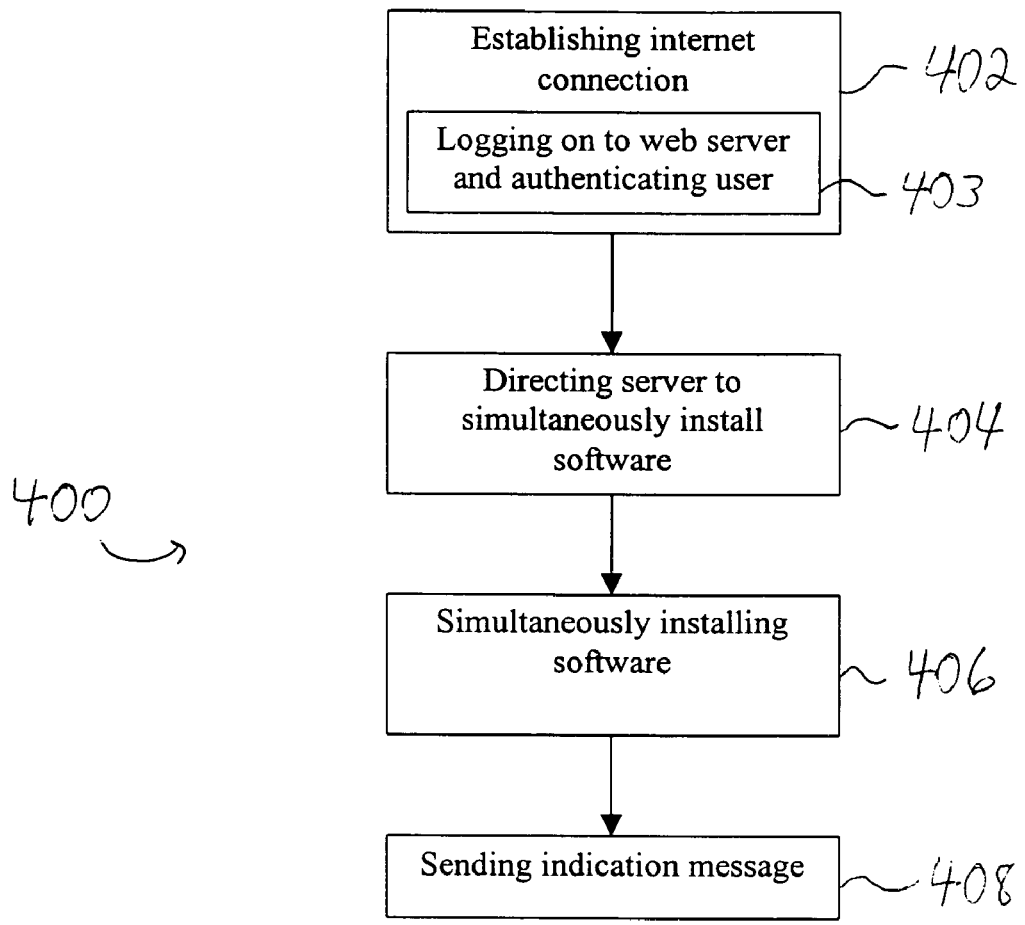
FIG. 4 illustrates a block diagram of a method for remotely enhancing a picture archiving communication system according to another alternative embodiment of the present invention.
Figure 5:
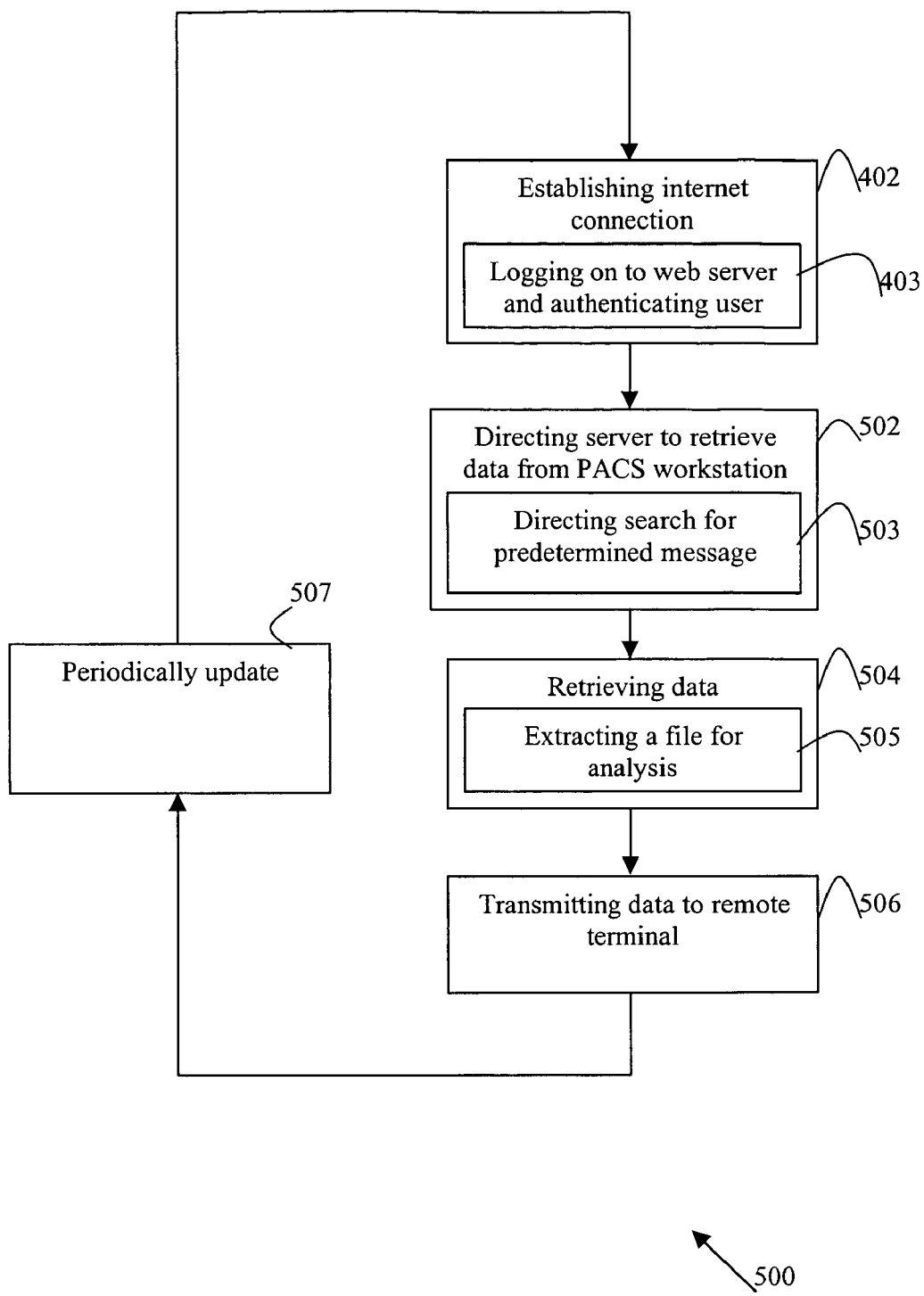
FIG. 5 illustrates a block diagram of a method for remotely monitoring a picture archiving communication system according to yet another alternative embodiment of the present invention.

FIG. 4 depicts a method for remotely enhancing a PACS 400 including an establishing step 402, a logging on step 403, a directing step 404, an installing step 406 and a sending step 408. The method corresponds to the PACS enhancing apparatus 200 of FIG. 2. FIG. 5 depicts a method for remotely monitoring a PACS 500 including the establishing step 402 and logging on step 403. The method 500 also includes a retrieval directing step 502, a search directing step 503, a retrieving data step 504 and an extracting step 505. The method 500 of FIG. 5 further includes a transmitting step 506 and a periodic updating step 507. The monitoring method 500 corresponds to the PACS monitoring apparatus 300 of FIG. 3.

Turning back to FIG. 2, a user at the remote terminal 202 may connect to the web-based server 206 via an Internet connection 204. In a preferred embodiment, the user at the remote terminal 202 communicates with the web-based server 206 via an Internet connection 204 using, for example, a land-line or a cellular connection. The remote terminal 202 may include, for example, a laptop computer (preferably with a CD-ROM drive). In a preferred embodiment, the remote user may be in a different city or country from the web-based server 206 (which will normally be at the location of the workstations 210). It is still advantageous, however, if the user is present at the site of the server 206, since the time of traveling between each of the workstations 210 will be saved, as will be further discussed below. Establishing the Internet connection corresponds to the step 402 of FIGS. 4 and 5.

In the typical application, the Internet communication may be over a private Internet arrangement created by, for example, a hospital. Because of the confidential nature of hospital records, the Internet connection may preferably only be made by authenticating the user using, for example, a login name and password. The process of logging on to the web server 206 and authenticating the user corresponds to the logging on and authenticating step 403 of FIGS. 4 and 5.

Once the Internet connection is established, the remote user may confirm that he or she is connected to the proper server and in turn able to download information to the desired workstations. At some point the remote user will make available at the remote terminal 202 software or a software patch for downloading to the workstations 210. The remote user may make the software available, for example, by placing it in a CD-ROM drive connected to the remote terminal 202.

The remote user may then instruct the web-based server 206 to install the software on one or more of the workstations 210. In the preferred embodiment, the remote user will then instruct the web-based server 206 to simultaneously install the desired software or software patch, for example, onto all of the workstations 210. The instruction may come, for example, in the form of a click with a mouse on an "install" icon on a monitor at the remote terminal 202. The installer 208 will then install the software onto each of the workstations 210. The number of workstations is generally set, for example, by the hospital or laboratory where the workstations 210 are located, and may number 150–200 or more based on need. The number of workstations 210 to which the software may be installed is not, however, limited except by the limitations of the web-based server 206 and installer 208. The instructions to install and the installation of the software correspond to the directing step 404 and simultaneous installing step 406 of FIG. 4.

Once the installation is complete, the apparatus 200 may be configured such that the web-based server 206 may send a message to the remote terminal 202, indicating whether the software installation was successful, as shown in step 408 of FIG. 4.

Figure 1:
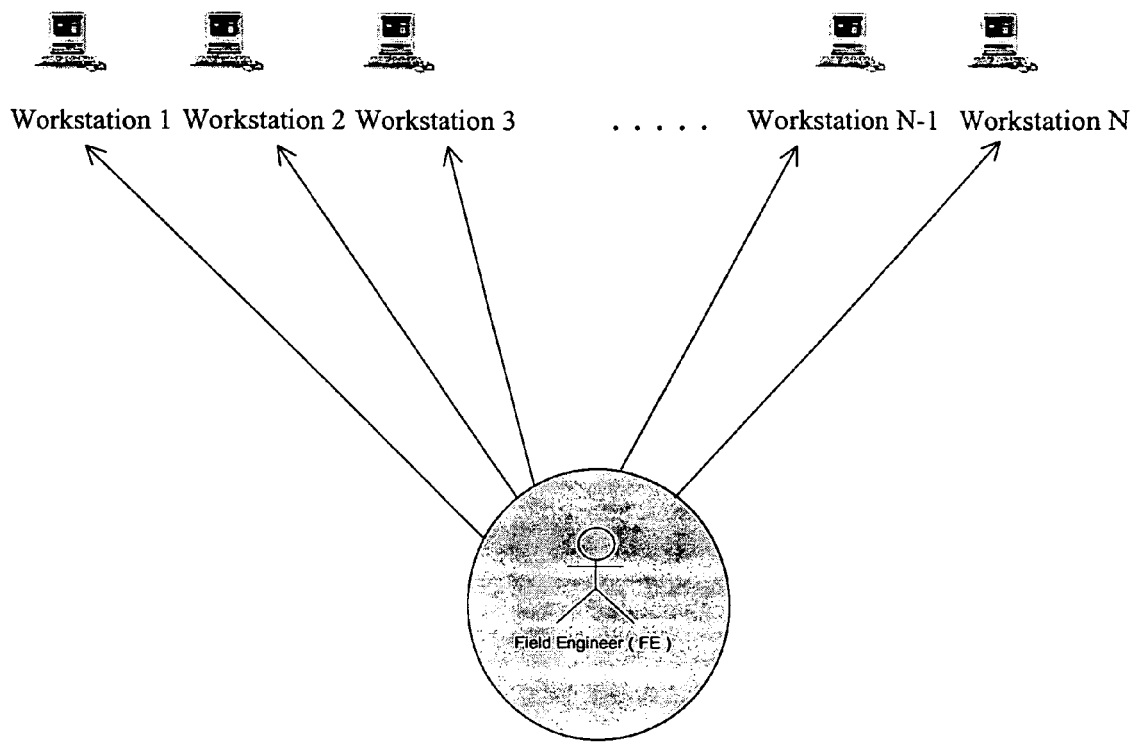
FIG. 1 illustrates a block diagram of a prior art picture archiving communication system (PACS).

As a result of the improved apparatus 200 and method 400, a field engineer may install software much more quickly and at considerably less expense than in the prior art method of FIG. 1. First, the field engineer need not travel to the location of the workstations 210 to install the software or software updates, as was required in prior art methods. This saves both traveling time and traveling cost for the field engineer. Second, the field engineer may install the software simultaneously to several workstations, thereby saving the time necessary to travel between the several workstations (which may number between 150 and 200 or more). Third, the field engineer need not wait for the installation to be over. He or she may check later to see if the installation was successful. This also saves the time necessary for the field engineer to separately install the software onto each of the workstations 210. As a result, the field engineer may perform the installation of software onto N workstations 210 in a time equal to:

$$\text{Time to upgrade } N \text{ workstations} = T + X + Y;$$

where T is the time taken to install the software, N is the number of workstations to be upgraded, X is the time it takes the remote terminal 202 to copy the file(s) to the web-based server 208 and Y is the sum of time it takes for the web-based server to push or copy the files to the desired workstations 210. As a result, Y is directly proportional to N. Once the files are pushed to the workstations 210, the installer 208 may then simultaneously install the files to the workstations 210. This is considerably less than the time taken for the field engineer to travel to each workstation individually and update the software, which as described above was:

$$\text{Time to upgrade } N \text{ workstations manually} = (T*N) + X + Y*(N-1).$$

Turning again to FIGS. 3 and 5, in another embodiment of the present invention, it is desirable to monitor the PACS, for example for errors or to search, extract or download files of interest. In the embodiment of FIG. 3, the web-based server 206 is provided with a data retriever 302 for retrieving data from one or more of the PACS workstations. The apparatus 300 and method 500 of FIGS. 3 and 5, respectively, operate in a somewhat similar way to the apparatus 200 and method 400 of FIGS. 2 and 4. In the remote monitoring apparatus of FIG. 3, however, the web-based server 206 and data retriever 302 respond to the instructions from the remote terminal 202 by retrieving data from one or more of the plurality of PACS workstations 210.

In a preferred embodiment, the web-based server 206 and data retriever 302 respond to instructions from the remote terminal 202 to extract files form one or more of the workstations 210. Such an extraction may be desired, for example, when an error occurs at one of the workstations 210. Errors often occur in PACS workstations and may occur in image files or in the process of analyzing image files at the workstation 210. One way to detect such errors is for a field engineer to analyze a log file from the workstation 210 where the error occurs. By analyzing the log file, which tracks the desired log message when an error occurs, the engineer may determine the cause of the error and be able to correct it remotely. When an error occurs in an image file, the engineer may remotely extract the image as well, by instructing the web-based server 206 and data retriever 302 to do so. The engineer may then locate and correct the error remotely, without traveling to the location of the workstations 210. As a result, the same benefits achieved when the apparatus for remotely enhancing a PACS 200 and the method for remotely enhancing a PACS 400 may be achieved when using the apparatus 300 and method 500 for remotely monitoring a PACS.

For example, referring still to FIGS. 3 and 5, once the Internet connection is established with the engineer at the remote terminal 202, the engineer using the remote terminal 202 may direct the server 206 to retrieve data from a PACS workstation 210, as illustrated in step 502. This may include directing a search for a predetermined message, for example an error message, as illustrated in step 503 of FIG. 5. Once the desired data is located, the server 206, in conjunction with the data retriever 302, may retrieve the data (for example a file), as indicated in steps 504 and 505. The data or file may then be transmitted to the remote terminal 202 for analysis and, for example, to locate any errors. This process may be periodically repeated or updated as illustrated by the periodic updating step 507 of FIG. 5. The process may be repeated, for example, every five or ten minutes.

Referring generally to FIGS. 2 through 5, the components of the remote terminal 202, web-based server 206, installer 208, workstations 210 and data retriever 302 may be implemented using combinatorial logic, an ASIC, through software implemented by a CPU, a DSP chip, or the like. Additionally, the foregoing hardware elements may be part of hardware that is used to perform other operational functions. The remote signal 203, log files, image files, installed software and software patches may be stored in registers, RAM, ROM, or the like, and may be generated through software, through a data structure located in a memory device such as RAM or ROM, and so forth.

While particular embodiments of the invention have been shown, it will be understood, of course, that the invention is not limited thereto since modifications may be made by those skilled in the art, particularly in light of the foregoing teachings. It is, therefore, contemplated that the appended claims will cover any such modifications as incorporate those features that constitute the essential features of these improvements within the true spirit and the scope of the invention.

What is claimed is:

1. A method for remotely enhancing a picture archiving and communication system, said method comprising:

establishing, by a remote terminal, a network connection with a web-based server;

remotely connecting, by said web-based server, to a plurality of picture archiving and communication system workstations;

reporting a detected error at one or more of said plurality of picture archiving and communication system workstations, to the web-based server;

periodically providing software for installation, by said remote terminal, to said plurality of picture archiving and communication system workstations in response to said detected error;

directing, by said remote terminal, the web-based server to simultaneously install the software to said plurality of picture archiving and communication system workstations in communication with said web-based server; and simultaneously installing software to said plurality of picture archiving and communication system workstations.

2. The method of claim 1 wherein said directing step comprises instructing the server to install at least one software update to the plurality of workstations.

3. The method of claim 1 wherein said establishing step comprises logging on to a web server and authenticating a user.

4. The method of claim 1 further comprising sending an indication message to the remote terminal to indicate whether the software installation was successful.

5. A method for remotely monitoring a picture archiving and communication system, said method comprising:

establishing a network connection with a web-based server from a remote terminal;

directing, by said remote terminal said web-based server to retrieve data from at least one file, from at least one of a plurality of picture archiving and communication system workstations in communication with said web-based server, said data including a log containing an error indicator;

retrieving, by said web-based server, said data from said at least one file;

transmitting, by said web-based server, said data to a remote terminal;

identifying, by said remote terminal, an error occurring at at least one of said plurality of picture archiving and communication system workstations based on said error indicator in said data; and directing, by said remote terminal, said web-based server in updating software stored on at least one of said plurality of picture archiving and communication system workstations to correct said error.

6. The method of claim 5 wherein said retrieving step comprises extracting the at least one file for analysis at the remote terminal.

7. The method of claim 6 wherein said extracting step comprises extracting at least one log file.

8. The method of claim 6 wherein said extracting step comprises extracting at least one image file.

9. The method of claim 5 wherein said directing step comprises directing a search of files for a predetermined message in at least one of the plurality of workstations, and said retrieving step comprises retrieving files that include said predetermined message.

10. The method of claim 9 wherein said directing step comprises directing a search of files for an error indicator in at least one of the plurality of workstations, and said retrieving step comprises retrieving files that include said error indicator.

11. An apparatus for remotely enhancing a picture archiving and communication system comprising:
   a remote first terminal in communication with a web-based server via an Internet connection, said remote first terminal remotely monitoring a picture archiving and communication system workstation to generate a remote signal requesting installation of software in response to an error reported by the workstation;
   a plurality of picture archiving and communication system workstations connected to said web-based server; and
   said web-based server comprising an installer for simultaneously installing software to said plurality of picture archiving and communication system workstations responsive to said remote signal.

12. The apparatus of claim 11 wherein a first workstation generates the remote signal for instructing said web-based server to install software to said plurality of workstations.

13. The apparatus of claim 11 wherein said web-based server comprises an installer for simultaneously installing software updates for pre-existing software to said plurality of picture archiving and communication system workstations.

14. An apparatus for remotely monitoring a picture archiving and communication system comprising:
   a remote first terminal in communication with a web-based server via a network connection, said remote first terminal comprising a remote signal generated in response to an error detected by a picture archiving and communication system workstation;
   a plurality of picture archiving and communication system workstations connected to said web-based server; and
   said web-based server comprising a data retriever for retrieving data from at least one of said plurality of picture archiving and communication system workstations responsive to said remote signal;
   said web-based server, responsive to a signal generated by said remote terminal, providing remote identification and correction of an error at at least one of said plurality of picture archiving and communication system workstations, by updating software stored on at least one of said plurality of picture archiving and communication system workstations.

15. The apparatus of claim 14 wherein said web-based server comprises said data retriever for retrieving log files from at least one of said plurality of picture archiving and communication system workstations responsive to said remote signal.

16. The apparatus of claim 14 wherein said web-based server comprises said data retriever for retrieving image files from at least one of said plurality of picture archiving and communication system workstations responsive to said remote signal.

17. A method for remotely monitoring a picture archiving and communication system, said method comprising:
   connecting, by a remote terminal, to a web-based server on a network;
   instructing, by said remote terminal, said web-based server to extract log data from each of a plurality of picture archiving and communication system workstations in communication with said web-based server, wherein said log data indicates an error occurring at one or more of said plurality of picture archiving and communication system workstations;
   transmitting, by said web-based server, said log data to said remote terminal for analysis of said error; and
   remotely correcting said error at said plurality of picture archiving and communication system workstations from said remote terminal using said web-based server.

18. The method of claim 17, further comprising extracting at least one image file from at least one of the plurality of picture archiving and communication system workstations.

19. A method for remotely enhancing a picture archiving and communication system, said method comprising:
   connecting to a web-based server from a remote terminal on the Internet;
   instructing, by said remote terminal said web-based server to update pre-existing software on a plurality of picture archiving and communication system workstations in communication with said web-based server;
   simultaneously updating by said web-based server said pre-existing software on said plurality of picture archiving and communication system workstations.

20. The method of claim 19, further comprising logging on to the web-based server and authenticating a user.

* * * * *

UNITED STATES PATENT AND TRADEMARK OFFICE
CERTIFICATE OF CORRECTION

| | | |
|---|---|---|
| PATENT NO. | : 7,007,274 B1 | Page 1 of 1 |
| APPLICATION NO. | : 09/472290 | |
| DATED | : February 28, 2006 | |
| INVENTOR(S) | : Patel et al. | |

It is certified that error appears in the above-identified patent and that said Letters Patent is hereby corrected as shown below:

At column 6, line 50, after "terminal", insert --,--.

At column 7, line 25, delete "reported by" and insert --at--.

At column 8, line 5, after "stations" delete ",".

At column 8, line 43, after "terminal", insert --,--.

At column 8, line 47, after "updating", insert --,--.

At column 8, line 47, after "server", insert --,--.

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,007,274 B1 | Page 1 of 1 |
| APPLICATION NO. | : 09/472290 | |
| DATED | : February 28, 2006 | |
| INVENTOR(S) | : Patel et al. | |

It is certified that error appears in the above-identified patent and that said Letters Patent is hereby corrected as shown below:

At the face of patent, assignee, delete "GE Medical Systems Global Technology Company, LLC, Waukesha, WI (US)" and insert --General Electric Company, Schenectady, New York (US)--

Signed and Sealed this
Twenty-eighth Day of June, 2011

David J. Kappos
*Director of the United States Patent and Trademark Office*